(12) United States Patent
Miura et al.

(10) Patent No.: US 8,159,728 B2
(45) Date of Patent: Apr. 17, 2012

(54) IMAGE READING APPARATUS, IMAGE READING METHOD, AND SHEET PROCESSING APPARATUS

(75) Inventors: Junji Miura, Naka-gun (JP); Seiji Ikari, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 875 days.

(21) Appl. No.: 12/204,450

(22) Filed: Sep. 4, 2008

(65) Prior Publication Data

US 2009/0208065 A1   Aug. 20, 2009

(30) Foreign Application Priority Data

Feb. 19, 2008   (JP) ................................. 2008-037895

(51) Int. Cl.
*H04N 1/04*  (2006.01)

(52) U.S. Cl. ........ 358/475; 358/509; 358/486; 358/482; 382/112; 382/254; 399/395

(58) Field of Classification Search .................. 358/474, 358/488, 486, 497, 496, 509, 475, 505, 520, 358/494, 516, 527; 382/112, 254, 275, 289; 399/395, 107
See application file for complete search history.

(56) References Cited

U.S. PATENT DOCUMENTS

| | | | | |
|---|---|---|---|---|
| 5,528,387 A * | 6/1996 | Kelly et al. | .................... | 358/488 |
| 6,603,953 B2 * | 8/2003 | Jewell | ........................... | 399/395 |
| 6,958,834 B1 * | 10/2005 | Ide | ................................ | 358/505 |
| 7,133,573 B2 * | 11/2006 | Brugger et al. | ............... | 382/289 |
| 7,456,280 B2 * | 11/2008 | Musa | ............................. | 544/192 |
| 7,495,248 B2 * | 2/2009 | Mitsui et al. | ............. | 250/559.36 |
| 7,557,969 B2 * | 7/2009 | Sone | ............................. | 358/504 |
| 7,583,927 B2 * | 9/2009 | Takahashi et al. | ............ | 399/395 |
| 7,688,477 B2 * | 3/2010 | Ikeno et al. | ................... | 358/449 |
| 7,936,477 B2 * | 5/2011 | Sakakibara | .................... | 358/1.9 |
| 8,094,345 B2 * | 1/2012 | Hashizume | ................... | 358/461 |
| 2001/0022675 A1 * | 9/2001 | Kelly et al. | .................... | 358/488 |
| 2003/0090056 A1 * | 5/2003 | Fang | ............................ | 271/226 |
| 2004/0160650 A1 * | 8/2004 | Ide | ................................ | 358/509 |
| 2005/0207740 A1 * | 9/2005 | Fukushima | ................... | 386/127 |
| 2005/0219652 A1 * | 10/2005 | Park | ............................. | 358/488 |

(Continued)

FOREIGN PATENT DOCUMENTS

JP   58-22488   2/1983

(Continued)

OTHER PUBLICATIONS

European Search Report dated Dec. 3, 2008 for Appln. No. 08015691.2-1228.

(Continued)

*Primary Examiner* — Negussie Worku

(74) *Attorney, Agent, or Firm* — Pillsbury Winthrop Shaw Pittman, LLP

(57) ABSTRACT

An image reading apparatus, in which sheets being transported are illuminated by an illuminating unit, one after another, and a sensor having an imaging elements arranged in a line photographs the sheets, one after another. A white-reference part is provided in a part of the photographing region of the sensor. A black-reference part guides the light reflected by the illuminating unit to the sensor when a sheet lies in the photographing region of the sensor, and to restrict application of the light reflected by the illuminating unit to the sensor when no sheets lie in the photographing region of the sensor.

10 Claims, 11 Drawing Sheets

U.S. PATENT DOCUMENTS

| | | | |
|---|---|---|---|
| 2006/0001917 A1 | 1/2006 | Chen | |
| 2007/0103735 A1* | 5/2007 | Ikeno et al. | 358/449 |
| 2007/0242319 A1* | 10/2007 | Okada et al. | 358/486 |
| 2007/0242997 A1* | 10/2007 | Takahashi et al. | 399/395 |
| 2010/0134855 A1* | 6/2010 | Oumi | 358/475 |

FOREIGN PATENT DOCUMENTS

| | | |
|---|---|---|
| JP | 62-30459 U | 2/1987 |
| JP | 04-185166 | 7/1992 |
| JP | 05-80065 U | 10/1993 |
| JP | 07-283913 | 10/1995 |
| JP | 09-231311 | 9/1997 |
| JP | 11-219460 | 8/1999 |

OTHER PUBLICATIONS

Japanese Office Action dated Oct. 18, 2011.

* cited by examiner

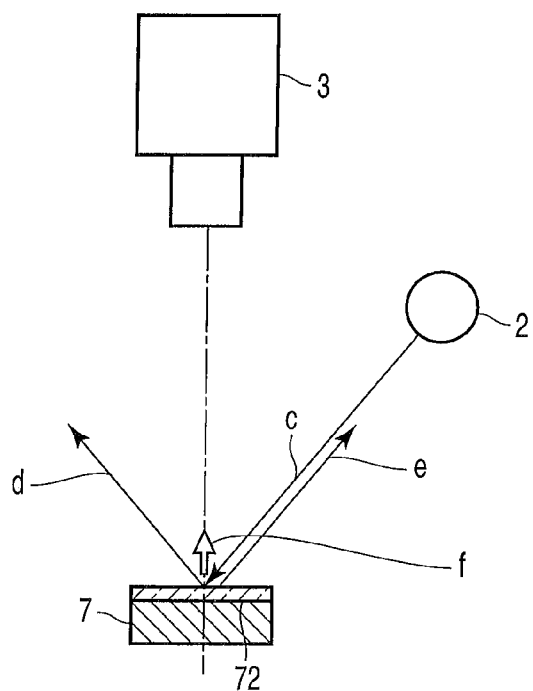
F I G. 3
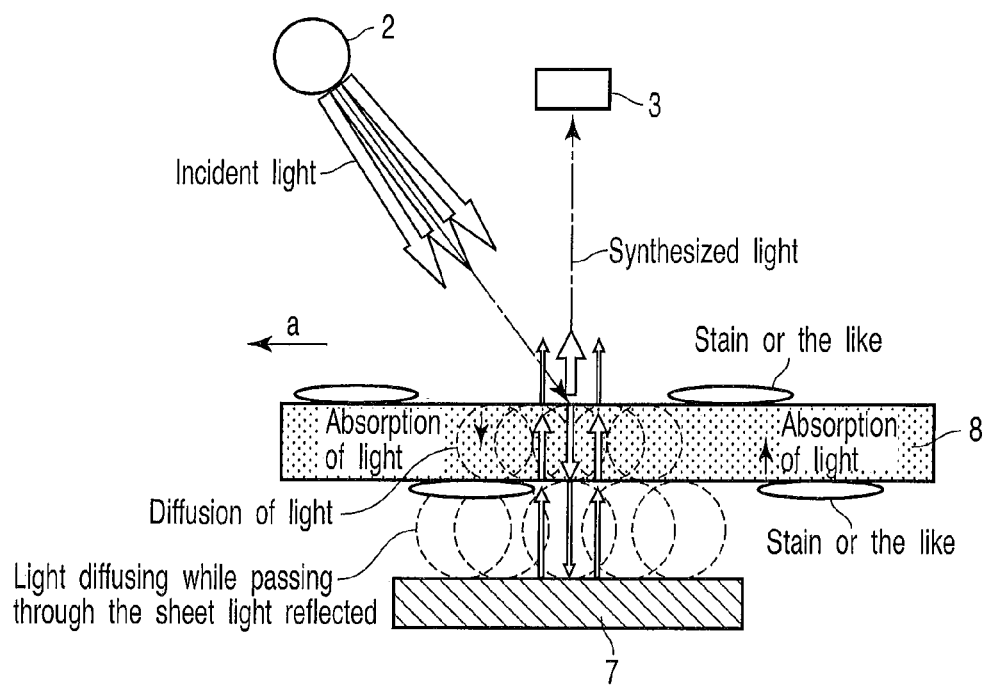
F I G. 4

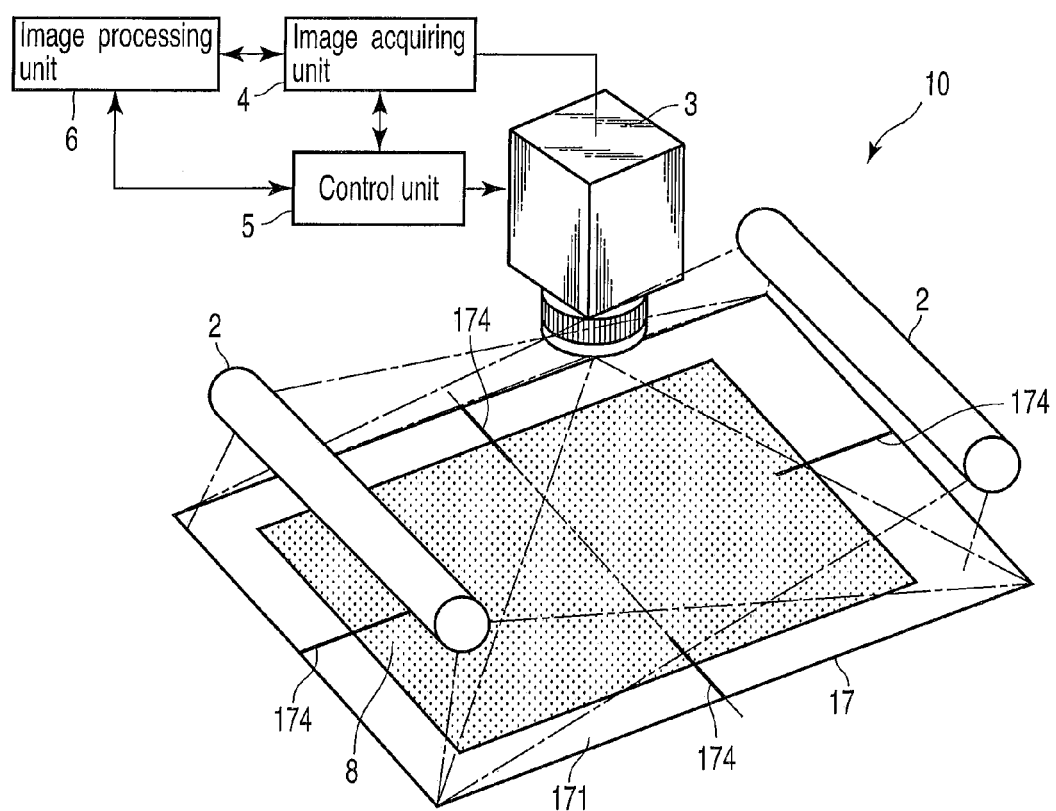
F I G. 14

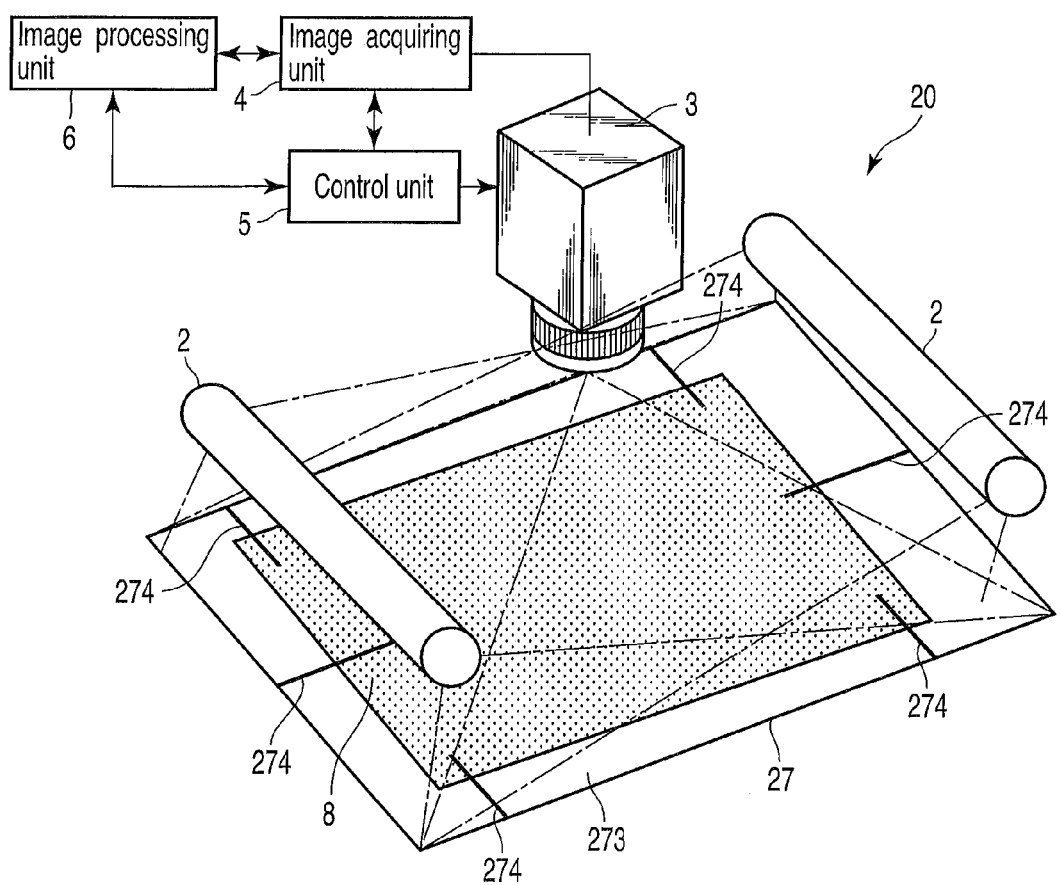
F I G. 15

IMAGE READING APPARATUS, IMAGE READING METHOD, AND SHEET PROCESSING APPARATUS

CROSS-REFERENCE TO RELATED APPLICATIONS

This application is based upon and claims the benefit of priority from prior Japanese Patent Application No. 2008-037895, filed Feb. 19, 2008, the entire contents of which are incorporated herein by reference.

BACKGROUND OF THE INVENTION

1. Field of the Invention

The present invention relates to an image reading apparatus and an image reading method, and a sheet processing apparatus, each configured to read the images of sheets, as the sheets being transported are photographed.

2. Description of the Related Art

Sheet processing apparatuses have been put to practical use, each designed to count and inspect sheets such as securities and bills. The sheet processing apparatus comprises a main unit and a management terminal. The main unit can bundle, seal or shred the sheets according to the results of inspection. The management terminal is connected to the main unit by a cable, such as a LAN cable, and manages the count information the main unit has generated.

Any sheet processing apparatus of this type has an image reading apparatus configured to acquire an image of each sheet in order to inspect the sheet. The image reading apparatus has a sensor, a background plate, and a reading surface. The sensor photographs sheets being transported in a transport path, and read images of the sheets. The background plate is set, facing the reading surface across the transport path. The background plate has a reference-color part (e.g., white part), so that the image reading apparatus may reliably read images from sheets. The sensitivity of the sensor is corrected on the basis of the image of the reference-color part that the sensor has read.

Sheets are not always transported in the same orientation along the transport path. They may skew with respect to the centerline of the transport path. If a sheet skews while being transported in the transport path, its image read from the sheet skewed will not collated with the reference image data stored in the sheet processing apparatus.

Most sheets are made of material having high reflectivity. An image-data reading apparatus that utilizes this fact is disclosed in Jpn. Pat. Appln. KOKAI Publication No. 9-231311. This image-data reading apparatus has a background plate having a black part (i.e., low-reflectivity part). Having this background plate, the image-data reading apparatus can detect the skew of a sheet, from the image of the sheet it has read.

The sheets any sheet processing apparatus can process are very thin, however. Part of the light applied to each sheet therefore passes through the sheet. In the image-data reading apparatus specified above, the light passing through the sheet is applied to the background plate. The background plate absorbs a part of the light and reflects the remaining part of the light. The light that the background plate has reflected passes through the sheet and illuminates the sensor. That part of the image of the sheet, which represents the black part (low-reflectivity part), is therefore darker than the remaining part of the image, which represents the white part (i.e., high-reflectivity part) of the background plate. Consequently, the image-data reading apparatus cannot acquire correct image data about the sheet even if the sensitivity of the sensor is corrected on the basis of the image of the reference-color part.

The sheet processing apparatus determines whether each sheet is a normal one or a stained one, from the image of the sheet that the image reading apparatus has read. The sheet processing apparatus discriminates any dark part of the image, as stain on the sheet. Inevitably, the apparatus regards the dark part of the image as stain on the sheet, though the dark part, i.e., the low-reflectivity part of the background plate, is not stain.

BRIEF SUMMARY OF THE INVENTION

According to one embodiment of the invention, an object of the invention is to provide an image reading apparatus, an image reading method, and a sheet processing apparatus, each able to detect the skew of each sheet and to read images of sheets reliably.

In order to attain the above object, the embodiment of the invention provide an image reading apparatus that comprises: an illuminating unit configured to illuminate sheets being transported, one after another; a sensor having an imaging elements arranged in a line and configured to photograph the sheets one after another; a background member having a white-reference part provided in a part of a photographing region of the sensor and a black-reference part configured to guide light reflected by the illuminating unit to the sensor when a sheet lies in the photographing region of the sensor, and to restrict application of the light reflected by the illuminating unit to the sensor when no sheets lie in the photographing region of the sensor.

An embodiment of the present invention can provide an image reading apparatus, an image reading method, and a sheet processing apparatus, each able to detect the skew of each sheet and to read images of sheets reliably.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 3 is a diagram explaining how each directional reflecting part of the background plate reflect light applied to them;

FIG. 4 is a diagram showing that section of the image reading apparatus of FIG. 1, which lies near the sensor, as viewed in a direction at right angles to the sheet-transporting direction;

FIG. 14 is a diagram schematically showing an image reading apparatus that has an area image sensor used as sensor;

FIG. 15 is a diagram schematically showing another image reading apparatus that has an area image sensor used as sensor.

DETAILED DESCRIPTION OF THE INVENTION

An image reading apparatus, an image reading method, and a sheet processing apparatus, according to a first embodiment of the invention will be described in detail, with reference to FIGS. 1 to 4, FIGS. 5A and 5B, FIGS. 6 and 7.

Figure 1:
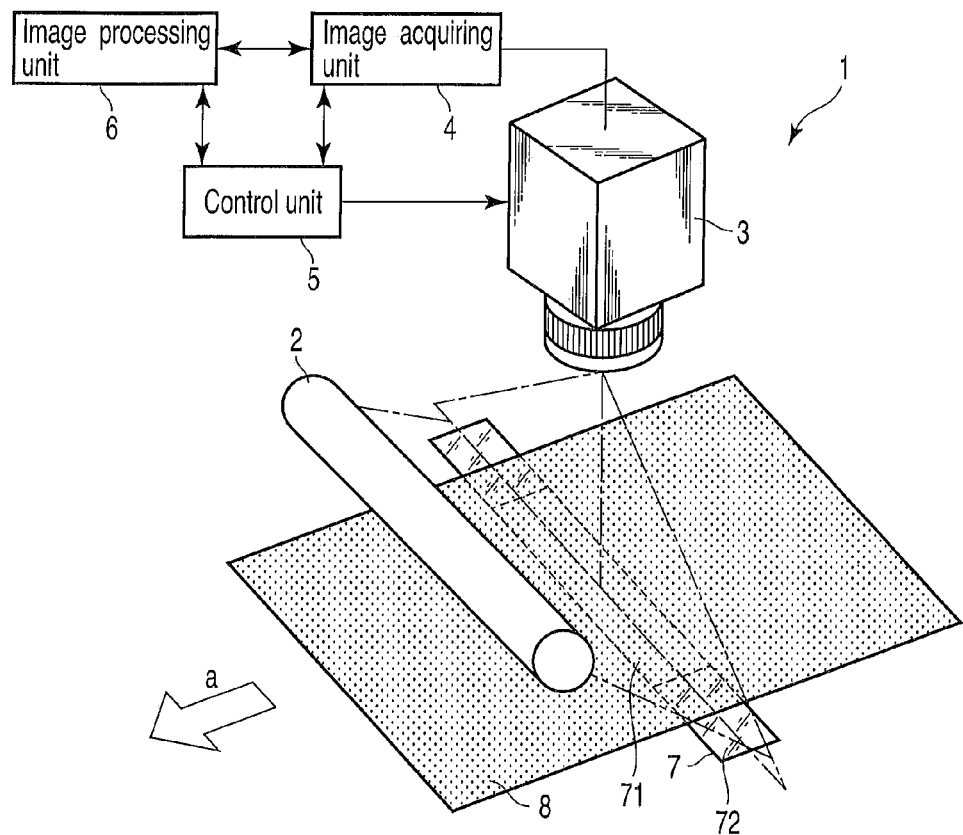
FIG. 1 is a diagram schematically showing an image reading apparatus according to a first embodiment of the present invention.
Figure 2:
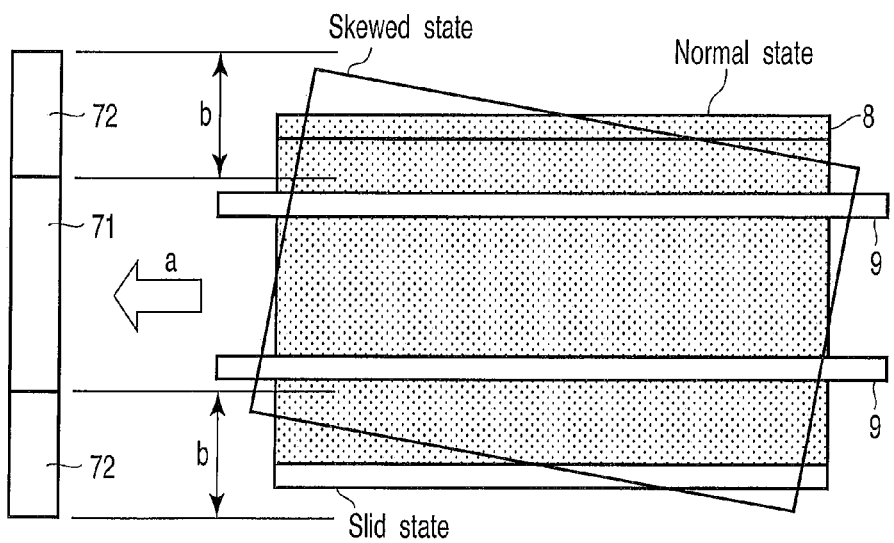
FIG. 2 is a diagram explaining how a sheet is transported to a position where the background plate shown in FIG. 1 is arranged.

FIG. 1 is a diagram schematically showing an image reading apparatus according to a first embodiment of this invention. FIG. 2 is a diagram explaining how a sheet is transported to a position where the background plate shown in FIG. 1 is arranged.

As shown in FIGS. 1 and 2, the image reading apparatus 1 has a light source 2, a sensor 3, an image acquiring unit 4, a control unit 5, an image processing unit 6, a background plate 7, and a pair of conveyor belts 9. The conveyor belts 9 constitute transporting unit.

The conveyor belts 9 are an upper belt and a lower belt. The conveyor belts 9 hold a sheet 8 and transport the sheet 8 in the direction of arrow a. Note that the transporting unit may be composed of a plurality of rollers, not the upper and lower belts.

The light source 2 is an illumination device having, for example, a xenon lamp, a mercury lamp, or a halogen lamp. The light source 2 serves as illuminating unit for applying light to any sheet that the conveyor belts 9 are transporting.

The sensor 3 is, for example, a line image sensor (line CCD) that scans the sheets 8 being transported, one after another in a one-dimensional fashion. The line sensor has imaging elements (pixels) that are arranged in a line, each receiving light and converting the light to an electric signal. Thus, the imaging elements generate data representing a region (photographing region) in which the sheet 8 is transported. As FIG. 1 shows, the light source 2 and the sensor 3 are located above the conveyor belts 9 (i.e., transport path).

The image acquiring unit 4 performs various processes, such as AGC correction and A/D conversion, on the image data that the sensor 3 has acquired.

The control unit 5 controls the light source 2, the sensor 3, the image acquiring unit 4, the image processing unit 6, and the conveyor belts 9. The control unit 5 has memories that functions as storage unit. The memories are, for example, a ROM, a RAM and a nonvolatile memory. The ROM stores control programs, control data, and reference image data. The reference image data is used in order to inspect sheets. The RAM functions as working memory, temporarily storing the data the control unit 5 is processing. The nonvolatile memory accumulates and stores image data items that the image reading apparatus 1 has read from sheets 8.

The image processing unit 6 detects the position and skew of a sheet 8 from the image data the sensor 3 has acquired, compensates the skew, calculates the characteristics of the image, and classifies the sheet 8. That is, the image processing unit 6 functions as a detecting unit for detecting the skew of the sheet 8. The configurations of the image acquiring unit 4, control unit 5 and image processing unit 6 will be described later.

Controlled by the control unit 5, the conveyor belts 9 transport a sheet 8, bringing the sheet 8 into the photographing region of the sensor 3. At the same time, the light source 2 applies light to the photographing region. The sheet 8 in the photographing region reflects the light. The sensor 3 receives the light reflected by the sheet 8 and coming from the photographing region. Therefore, the image reading apparatus 1 can acquire an image of the sheet 8.

As seen from FIG. 2, the background plate (background member) 7 is a rectangular and elongated plate. The background plate 7 lies in the photographing region of the sensor 3 and extends in the direction at right angles to the direction a in which the sheet 8 is transported, beyond both sides of the transporting area for the sheet 8. The background plate 7 has a surface that opposes the sheet 8. On this surface, the background plate 7 has a light diffusing/reflecting part 71 and two directional reflecting parts 72. The light diffusing/reflecting part 71 can diffuse light and reflect light at high reflectance. The directional reflecting parts 72 can reflect light at high directivity and high reflectance.

The light diffusing/reflecting part 71 functions as white-reference part, receiving light from the light source 2 and reflecting it in various directions. The directional reflecting parts 72 function as black-reference parts, each receiving light from the light source 2 and reflecting the light in a specific direction.

The directional reflecting parts 72 are provided at the ends of the background plate, which are spaced apart in the longitudinal direction thereof. Each directional reflecting part 72 is positioned to overlap one lateral edge of the sheet 8 being transported. The light diffusing/reflecting part 71 is provided on the entire surface of the background plate 7, except those regions in which the directional reflecting parts 72 are arranged, respectively. That is, the light diffusing/reflecting part 71 and the directional reflecting parts 72 are arranged side by side.

In most cases, the sheet 8 is transported to the photographing region in normal state, not displaced or skewed, as is illustrated in FIG. 2. In some cases, however, the sheet 8 may be displaced or skewed. That is, it may be transported in a slid/skewed state (skew-transported state). In view of this, the background plate 7 have two parts b, i.e., directional reflecting parts 72, which may overlap the lateral edges of any sheet transported to the photographing region.

FIG. 3 is a diagram explaining how each directional reflecting part 72 of the background plate 7 reflects light applied to them.

The light source 2 applies light to the background plate 7 in the direction of arrow c, as is shown in FIG. 3. The sensor 3 is arranged in the direction of arrow f and converts the light it receives into an electric signal.

Each directional reflecting part 72 is a directional reflecting member such as a mirror-surface member (mirror) or a reflexive reflection member. If the directional reflecting part 72 is a mirror-surface member, the light applied to the directional reflecting part 72 in the direction of arrow c will be reflected in the direction of arrow d, which is regular reflection direction. If the directional reflecting part 72 is a reflexive reflection member, the light applied to the directional reflecting part 72 in the direction of arrow c will be reflected in the direction of arrow e, which is identical in orientation and opposite in direction to the incidence direction of arrow c.

No matter whether the directional reflecting part 72 is a mirror-surface member or a reflexive reflection member, the light reflected in the direction of arrow f and traveling toward the sensor 3 is very little in amount. Therefore, the sensor 3 acquires a black image if it photographs the directional reflecting part 72.

As pointed out above, the sensor 3 is arranged in the direction of arrow f. Nonetheless, the sensor 3 may be arranged in any direction other than the direction in which the directional reflecting part 72 reflects light.

By contrast, the sensor 3 acquires a white image it receives light reflected from the diffusing/reflecting part 71 or the sheet 8.

FIG. 4 is a diagram showing that section of the image reading apparatus 1 of FIG. 1, which lies near the sensor 3, as viewed in a direction at right angles to the direction in which the sheet 8 is transported.

As FIG. 4 shows, the sheet 8 reflects a part of the light applied from the light source 2 to it. The remaining part of the light passes through the sheet 8 because the sheet 8 is thin. The sensor 3 receives the light reflected by the sheet 8.

The light pasting through the sheet 8 diffuses in the sheet 8. The background plate 7 reflects the light coming out from the sheet 8 after passing through the sheet 8. Part of the light reflected by the plate 7 passes through the sheet 8, diffusing in the sheet 8, and will be received by the sensor 3.

That is, the sensor 3 receives the light composed of two light beams. One of these light beams has been reflected from the surface of the sheet 8. The other light beam has passed through the sheet 8, has then been reflected by the background plate 7, and has finally passed again through the sheet 8.

As described above, each directional reflecting part 72 reflects the light coming from the light source 2, applying this light to the sensor 3, if a sheet 8 lies in the photographing region of the sensor 3. If no sheets 8 lie in the photographing region of the sensor 3, the directional reflecting part 72 inhibits the light emitted by the light source 2 from reaching the sensor 3.

In other words, the diffusing/reflecting part 71 and the directional reflecting parts 72 function as reflecting members that works irrespective of directivity, if a sheet 8 lies between the sensor 3 and the background plate 7. This is reduces the difference in intensity between the light radiated from that part of the photographing region of the sensor 3, where the sheet 8 overlaps either directional reflecting part 72 of the background plate 7, and also because the light radiated from that part of the photographing region of the sensor 3, where the sheet 8 overlaps the diffusing/reflecting part 71 of the background plate 7. As a result, the image reading apparatus 1 can reliably read the image of the sheet 8 as is illustrated in FIG. 5.

Figures 5A, 5B:
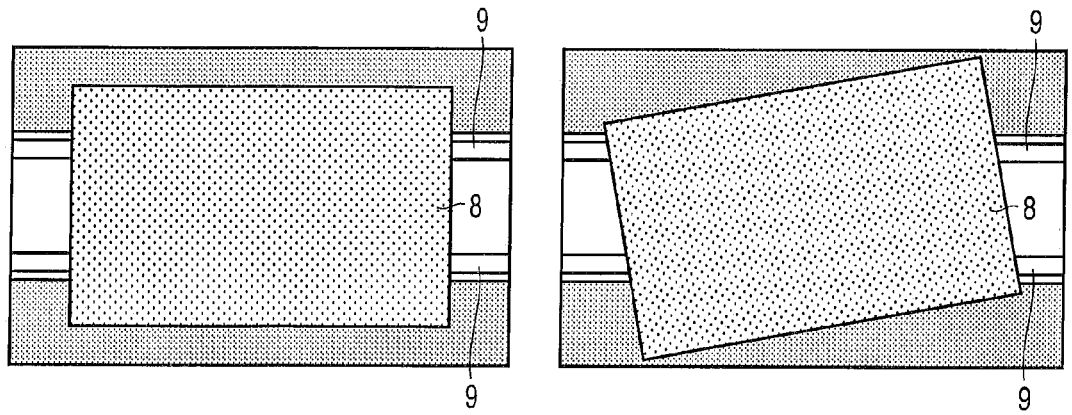
FIG. 5A is a diagram showing examples of images of a sheet, read by the image reading apparatus of FIG. 1.
FIG. 5B is a diagram showing examples of images of a sheet, read by the image reading apparatus of FIG. 1.

FIGS. 5A and 5B are diagrams showing examples of images of a sheet 8, read by the image reading apparatus 1 shown in FIG. 1. More precisely, FIG. 5A shows an image the sensor 3 outputs when the sheet 8 is transported in the normal state, and FIG. 5B shows an image the sensor 3 outputs when the sheet 8 is transported in a slid/skewed state. As shown in FIGS. 5A and 5B, no difference is observed between the image of those parts of the sheet 8, which overlap the directional reflecting parts 72, and the image of the other part of the sheet 8. Thus, the image reading apparatus 1 can acquire images not influenced by the directivity of either directional reflecting part 72 of the background plate 7, if the sheet 8 lies between the sensor 3 and the background plate 7.

The sheet 8 may have a stained part. In this case, the light beam reflected at the stained part is less intense that the light beams reflected at any other parts of the sheet 8. The image reading apparatus 1 can therefore detect the stained part easily.

Figure 6:
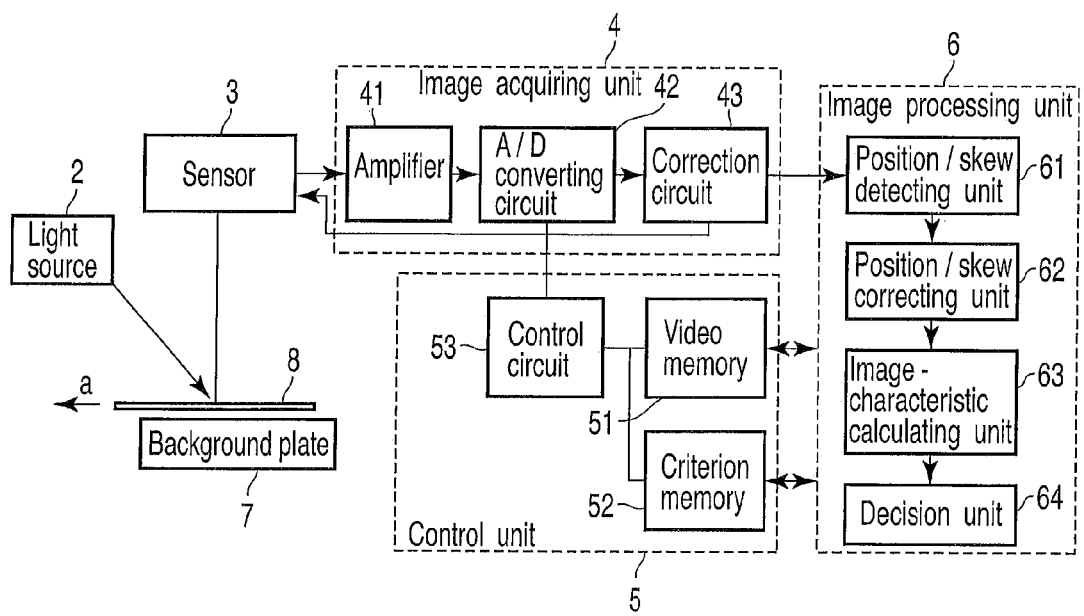
FIG. 6 is a block diagram, showing the function blocks of the image acquiring unit, image processing unit and control unit, all shown in FIG. 1.

FIG. 6 is a block diagram, showing the function blocks of the image acquiring unit 4, control unit 5 and image processing unit 6, all shown in FIG. 1.

As FIG. 6 shows, the image acquiring unit 4 comprises an amplifier 41, an analog-to-digital converting circuit (A/D converting circuit) 42, and a correction circuit 43.

The amplifier 14 receives a signal (image) from the sensor 3 and amplifies the same, generating an analog signal. The A/D converting circuit 42 converts the analog signal to a digital signal and outputs this signal as output signal. The correction circuit 43 corrects any error in the signal input to it, in accordance with the characteristics of the imaging elements of the sensor 3. The correction circuit 43 calculates the amplification factor of the amplifier 41 from the brightness of the pixels corresponding to the diffusing/reflecting part 71 of the background plate 7 and specified brightness. More specifically, the correction circuit 43 corrects the input signal so that those of the pixels defining the image received from the sensor 3, which correspond to the diffusing/reflecting part 71 of the background plate 7, may have the specified brightness.

As FIG. 6 shows, the control unit 5 comprises a video memory 51, a criterion memory 52, and a control circuit 53.

The video memory 51 stores and accumulates the image data items the image reading apparatus 1 has read. The criterion memory 52 stores a plurality of reference images of various types of sheets. The reference images are used to identify sheets of various types. The control circuit 53 controls the sensor 3, image acquiring unit 4 and image processing unit 6, which cooperate with one another. For example, the control circuit 53 controls the timing at which the sensor 3 photographs anything in the photographing region.

As shown in FIG. 6, the image processing unit 6 comprises a position/skew unit 61, a position/skew correcting unit 62, an image-characteristic calculating unit 63, and a decision unit 64.

When controlled by the control unit 5, the position/skew detecting unit 61 detects the positioning error and skew of the sheet 8 transported to the photographing region, from the images of the photographing region the sensor 3 has sequentially photographed.

The position/skew correcting unit 62 corrects the positioning of the sheet 8, in accordance with the error and skew of the sheet 8, which the position/skew detecting unit 61 has detected. In other words, the position/skew correcting unit 62 corrects the image of the sheet 8, so that the long sides of the sheet 8 may extend horizontally, or the short sides thereof may extend vertically.

The image-characteristic calculating unit 63 compares the image corrected in orientation with the reference images stored in the criterion memory 52, thereby determining the type of the sheet 8. That is, the image-characteristic calculating unit 63 functions as sheet-type determining unit. Further, the image-characteristic calculating unit 63 calculates the characteristic of the image, comparing the image corrected in orientation with the corresponding reference image, pixel by pixel, thereby detecting a stained part, if any in the image corrected in orientation. More precisely, the unit 63 determines that the sheet 8 has a stained part if any part of the image that is less bright than the pixels of the reference image.

The decision unit 64 compares the characteristics attained by the image-characteristic calculating unit 63 with the criterion stored in the criterion memory 52, finally determining whether the sheet 8 is a stained one or not.

The process performed after the image is acquired may differ in accordance with the result of inspection the image reading apparatus 1 performs on the sheet. Therefore, the process is not limited to the one described above.

As described above, the background plate 7 has a diffusing/reflecting part 71 that lie in the photographing region of the sensor 3, and directional reflecting parts 72 is provided, surrounding the part 71. Since the background plate 7 has directional reflecting members that may overlap the lateral edges of the sheet 8, the entire surface of the background plate 7 defines a region having high reflectivity. That is, the diffusing/reflecting part 71 and the directional reflecting parts 72 radiate light beams that are almost identical in intensity.

The sheet 8 may not overlap the regions where the directional reflecting members are arranged. In this case, the light applied to the directional reflecting members is reflected in the specific direction. The sensor 3 therefore detects a black image.

The image processing unit 6 detects the skew of the sheet 8, from the image the image acquiring unit 4 has acquired. Hence, an image reading apparatus 1 and an image reading method can be provided, which can reliably read images of sheets.

Further, a correction value can be calculated from reference brightness and the brightness read from the diffusing/reflecting part 71 of the background plate 7 no sheets 8 exist. Using the correction value, the image the image acquiring unit 4 has acquired can be corrected.

The embodiment described above has a background plate 7 shown in FIG. 7A. Instead, a background plate 7 of the type shown in FIG. 7B, FIG. 7C or FIG. 7D may be used, within the scope of this invention.

Figures 7A, 7C:
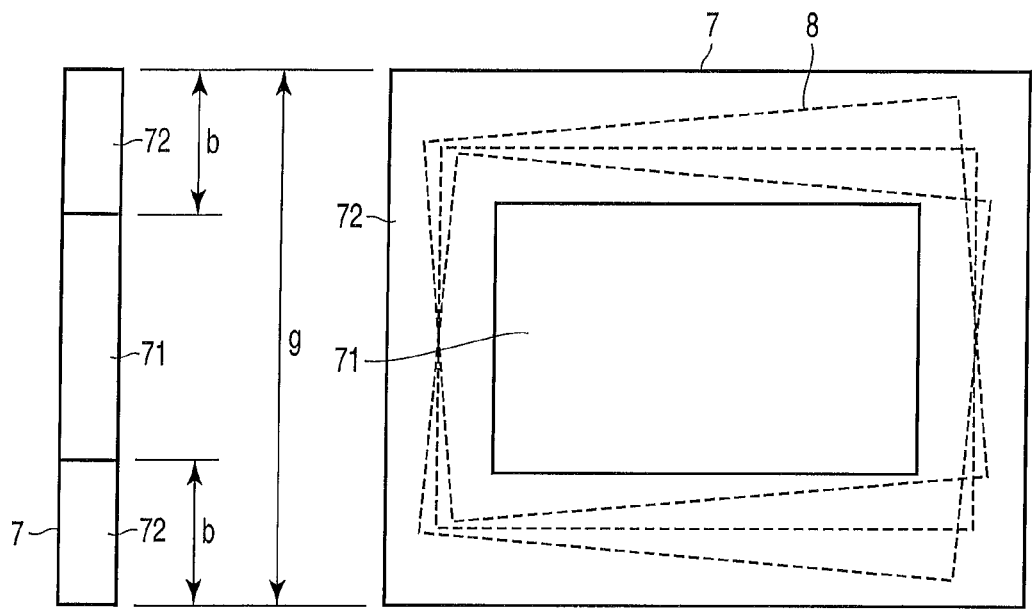
FIG. 7A is a diagram explaining patterns the background plate may have.
FIG. 7C is a diagram explaining patterns the background plate may have.
Figures 7B, 7D:
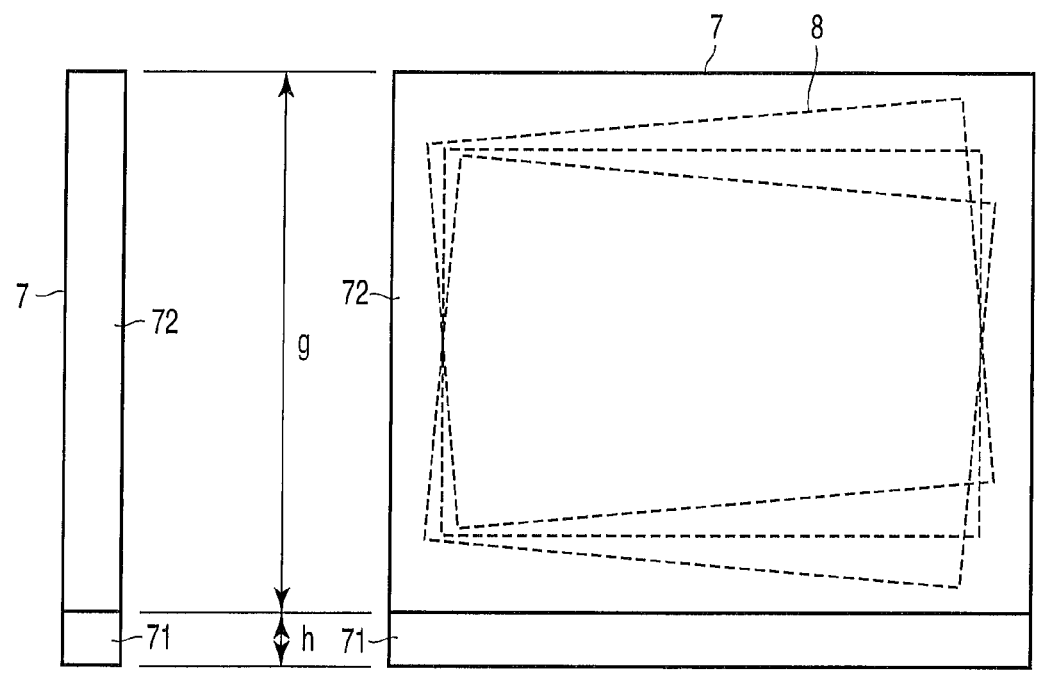
FIG. 7B is a diagram explaining patterns the background plate may have.
FIG. 7D is a diagram explaining patterns the background plate may have.

FIG. 7B is a diagram explaining a background plate 7 that has a diffusing/reflecting part 71 and a directional reflecting part 72. The diffusing/reflecting part 71 is provided in a region h over which no sheets 8 pass while being transported over the background plate 7. The directional reflecting part 72 is provided in a region g over which a sheet 8 passes while being transported.

As indicated above, the directional reflecting part 72 of the background plate 7 can be designed in various patterns, in view of the size and the like of the sheet that is transported over it.

The present invention can be reduced to practice even in the case where the image sensor 3 is an area sensor.

FIG. 7C and FIG. 7D are diagrams showing a background plate 7 that is used if the sensor 3 is an area image sensor.

The background plate 7 has a diffusing/reflecting part 71 and a directional reflecting part 72, as shown in FIG. 7C. The diffusing/reflecting part 71 is provided in a region that does not the lateral edges of the sheet 8. The directional reflecting part 72 is provided in a region that overlaps the lateral edges of the sheet 8.

As shown in FIG. 7D, the directional reflecting part 72 is provided in the region where the sheet 8 is arranged, and the diffusing/reflecting part 71 is provided in the region that lies in the photographing region of the sensor 3 and in a region in which no sheets 8 are arranged.

Even if the background plate 7 of the pattern described above is used, light beams of almost the same intensity are detected at the diffusing/reflecting part 71 and directional reflecting part 72. The parts 71 and 72 can detect edges of the sheet 8.

A second embodiment of the invention will be described.

An image reading apparatus 1 and an image reading method, both according to the second embodiment, will be described in detail with reference to FIGS. 8 to 11, FIGS. 12A and 12B, and FIGS. 13A to 13D, and FIGS. 14 and 15.

Figure 8:
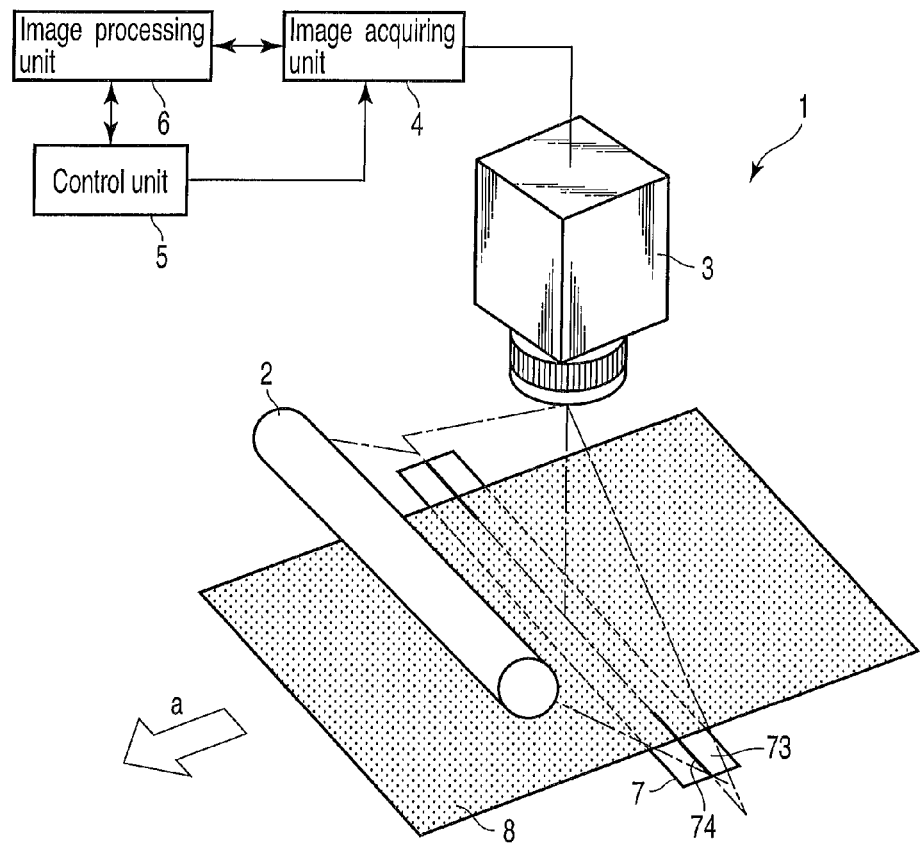
FIG. 8 is a diagram schematically showing an image reading apparatus according to a second embodiment of the present invention.
Figure 9:
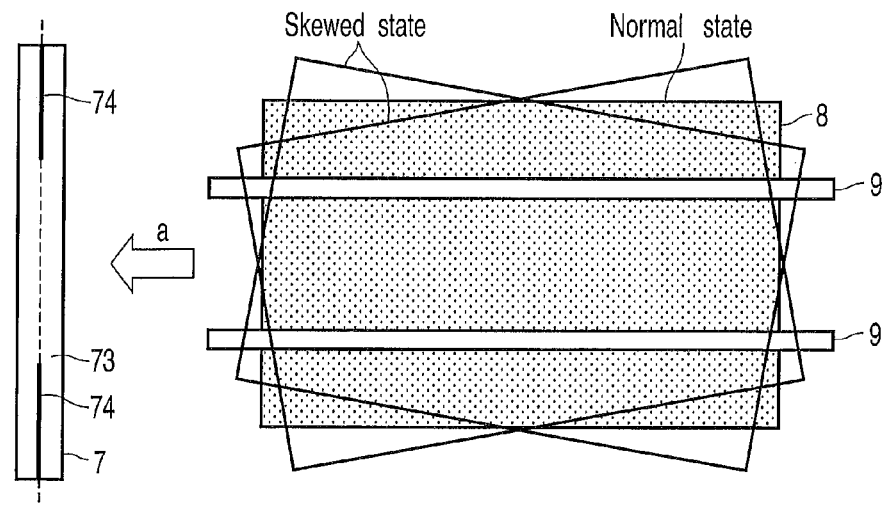
FIG. 9 is a diagram explaining how a sheet is transported to a position where the background plate shown in FIG. 8 is arranged.

FIG. 8 is a diagram schematically showing an image reading apparatus 1 according to a second embodiment of the present invention. FIG. 9 is a diagram explaining how a sheet is transported to a position where the background plate shown in FIG. 8 is arranged. The components shown in FIGS. 8 and 9, which are identical to those shown in FIGS. 1 and 2, are designated by the same reference numbers and will not be described in detail.

As seen from FIG. 8, the background plate (background member) 7 is rectangular and elongated. The background plate 7 lies in the photographing region of the sensor 3 and extends in the direction at right angles to the direction a in which the sheet 8 is transported, beyond both sides of the transporting area for the sheet 8. The background plate 7 has a surface that opposes the sheet 8. On this surface, the background plate 7 has a white part 73 and two black parts 74. The white part 73 can diffuse light and reflect light at high reflectance. The black parts 74 can reflect light at low directivity, or can absorb light.

The white part 73 functions as white-reference part, receiving light from the light source 2 and reflecting it in various directions. The black parts 74 function as black-reference parts, each absorbing light from the light source 2.

Figure 10:
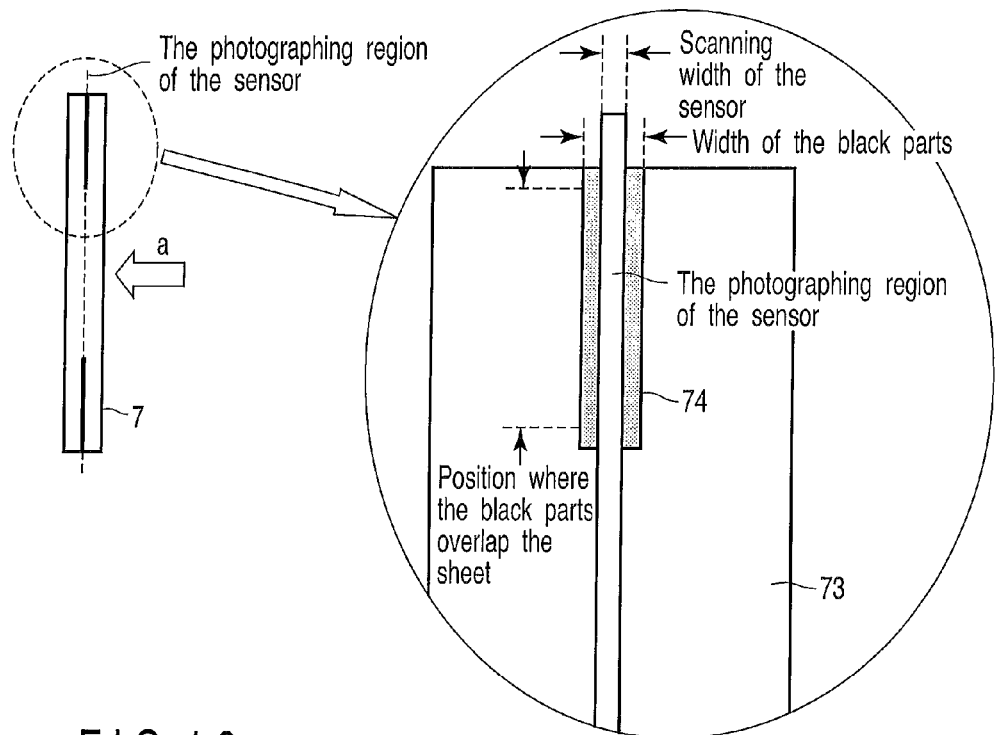
FIG. 10 is a diagram illustrating a configuration the background plate may have.

FIG. 10 is a diagram illustrating a configuration the background plate 7 may have. As shown in FIG. 10, the black parts 74 are provided at the ends of the background plate, which are spaced apart in the longitudinal direction thereof. Each black part 74 is positioned to overlap one lateral edge of the sheet 8 being transported. Each black part 74 extends for a distance equal to or longer than the scanning width of the sensor 3, i.e., a photographing region extending at right angles to the direction (scanning direction) in which the imaging elements of the sensor 3 are arranged. The white part 73 is arranged on the entire surface of the background plate 7, except those regions in which the black parts 74 are arranged, respectively. Thus, the light white part 73 and the black parts 74 are arranged side by side.

In this embodiment, the width of each black part 74, i.e., distance measured in a direction at right angles to the scanning direction of the sensor 3, is about three times the scanning width of the sensor 3. Nonetheless, the width of each black part 74 is not limited to three times the scanning width of the sensor 3. It is sufficient for the black parts 74 to have a width equal to or larger than the scanning width of the sensor 3. The smaller the difference between the width of either black part 74 and the scanning width of the sensor 3, the more cumbersome it will be to set the photographing region of the sensor 3 at the black parts 74. This is why the width of each black part 74 is, as specified above, three times the scanning width of the sensor 3. If the width of each black part 74 is increased, however, any image acquired will have low stability. Thus, the smaller the difference between the width of either black part 74 and the scanning width of the sensor 3, the more stable the image acquired will be.

Controlled by the control unit 5, the conveyor belts 9 transport a sheet 8, bringing the sheet 8 into the photographing region of the sensor 3. At the same time, the light source 2 applies light to the photographing region. The sheet 8 in the photographing region reflects the light. The sensor 3 receives the light reflected from the sheet 8 and coming from the photographing region. The image reading apparatus 1 can therefore acquire an image of the sheet 8.

In most cases, the sheet 8 is transported to the photographing region in normal state, not displaced or skewed, as is illustrated in FIG. 9. In some cases, however, the sheet 8 may be displaced or skewed. That is, it may be transported in a slid/skewed state (skew-transported state). In view of this, the background plate 7 has black parts 74 so arranged to overlap the lateral edges of any sheet 8 transported to the photographing region.

Since the background plate 7 has such a configuration as described above, the black parts 74 absorb those parts of the light applied from the light source 2 to the photographing region of the sensor 3, which have not been blocked by the sheet 8. Since the black parts 74 reflect little light, the sensor 3 acquires a black image.

By contrast, the remaining part of the light diffuses as it passes through the sheet 8 lying in the photographing region.

Figure 11:
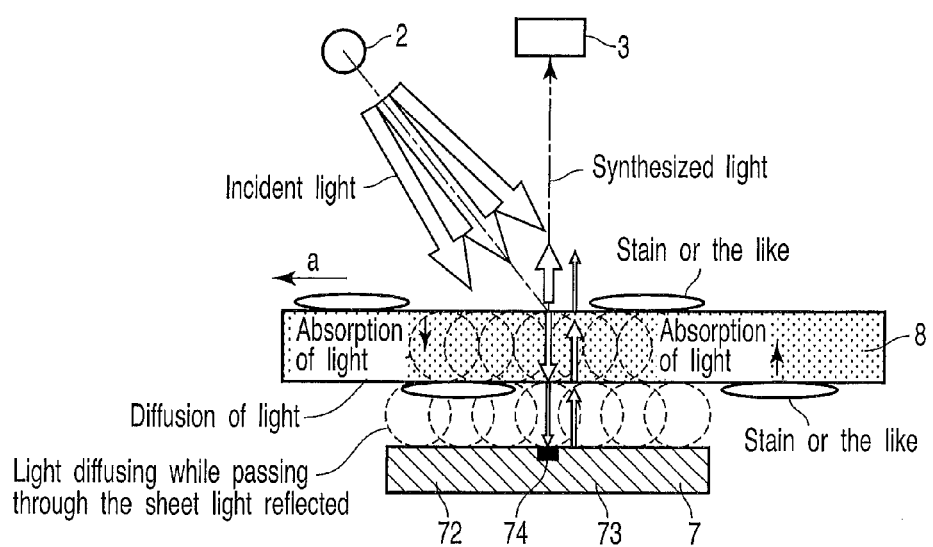
FIG. 11 is a diagram showing that section of the image reading apparatus of FIG. 8, which lies near the sensor, as viewed in a direction at right angles to the sheet-transporting direction.

FIG. 11 is a diagram showing that section of the image reading apparatus 1 of FIG. 8, which lies near the sensor 3, as viewed in a direction at right angles to the direction in which the sheet 8 is transported.

As FIG. 11 shows, the sheet 8 reflects a part of the light applied from the light source 2 to it, and the remaining part of the light passes through the sheet 8 because the sheet 8 is thin. The sensor 3 receives the light reflected by the sheet 8.

The light beam passing through the sheet 8, while diffusing. The After passing through the sheet 8, the light beam is reflected by the background plate 7. Part of the light beam thus reflected passes through the sheet 8 and diffuses while passing through the sheet 8 and is received by the sensor 3.

Thus, the sensor 3 receives light composed of the light reflected at the surface of the sheet 8 and the light first passing through the sheet 8, reflected by the background plate 7 and passing again through the sheet 8.

As indicated above, each black part 74 that serves as black-reference part has such a width that the light it absorbs may be compensated by the light diffused and reflected by the white part 73 that surrounds it. Therefore, the black part 74 reflects the light coming from the light source 2, applying this light to the sensor 3, if a sheet 8 lies in the photographing region of the sensor 3. If no sheets 8 lie in the photographing region of the sensor 3, the black part 74 inhibits the light emitted by the light source 2 from reaching the sensor 3.

Thus, the light reflected by the white part 73 of the background plate 7 diffuses in the sheet 8 while passing through the sheet 8. As a result, part of the light reflected by those parts of the white part 73, which lie near the black part 74, radiate from those parts of the sheet 8, which overlap the black part 74 of the background plate 7. This reduces the difference in intensity between the light radiated from that part of the photographing region of the sensor 3, where the sheet 8 overlaps either black part 74 of the background plate 7, and the light radiated from that part of the photographing region of the sensor 3, where the sheet 8 overlaps the white part 73 of the background plate 7.

Figure 12B:
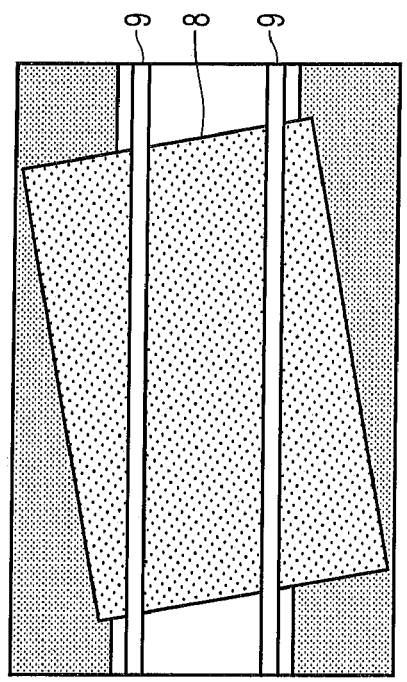
FIG. 12B is a diagram showing examples of images of a sheet, read by the image reading apparatus of FIG. 8.
Figure 12A:
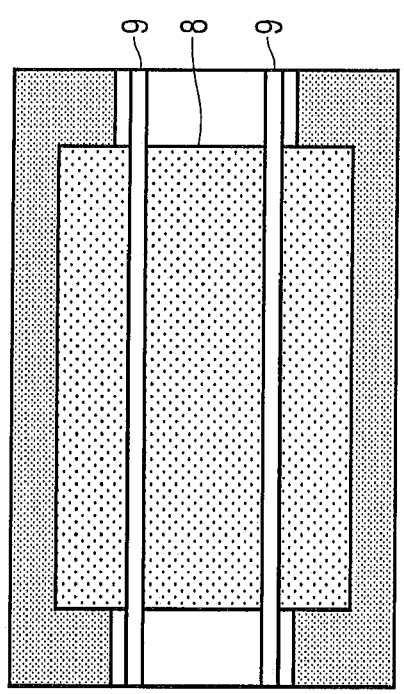
FIG. 12A is a diagram showing examples of images of a sheet, read by the image reading apparatus of FIG. 8.

As a result, the image reading apparatus 1 can reliably read the image of the sheet 8 as is illustrated in FIGS. 12A and 12B.

FIGS. 12A and 12B are diagrams showing examples of images of a sheet, read by the image reading apparatus 1 of FIG. 8. More precisely, FIG. 12A shows an image the sensor 3 outputs when the sheet 8 is transported in normal state, and FIG. 12B shows an image the sensor 3 outputs when the sheet 8 is transported in a slid/skewed state. As shown in FIGS. 12A and 12B, no difference is observed between the image of those parts of the sheet 8, which overlap the black 74 of the background plate 7, and the image of the other part of the sheet 8. That is, the image reading apparatus 1 can acquire images not influenced by the directivity of either black part 72 of the background plate 7.

The sheet 8 may have a stained part. In this case, the light beam reflected at the stained part is less intense that the light beams reflected at any other parts of the sheet 8. The image reading apparatus 1 can therefore detect the stained part easily.

As described above, In the image reading apparatus 1, the background plate 7 has black parts 74 (low-reflectivity parts) in the region corresponding to the photographing region of the sensor 3k and a white part 73 (high-reflectivity part) 73 surrounding either black part 74. Since the low-reflectivity parts occupy a minimum area required, the light diffusing while passing through the sheet 8 can compensate for the difference between the intensity of the light reflected from either low-reflectivity part and the intensity of the light reflected from the high-reflectivity part. That is, the white part 73 and the black parts 74 radiate light beams of almost the same intensity.

The image processing unit 6 detects the skew of the sheet 8, from the image the image acquiring unit 4 has acquired. Hence, an image reading apparatus 1 and an image reading method can be provided, which can reliably read images of sheets.

The embodiment described above has a background plate 7 shown in FIG. 13A. Instead, a background plate 7 of the type shown in FIG. 13B, FIG. 13C or FIG. 13D may be used, within the scope of this invention.

Figures 13A, 13B, 13C, 13D:
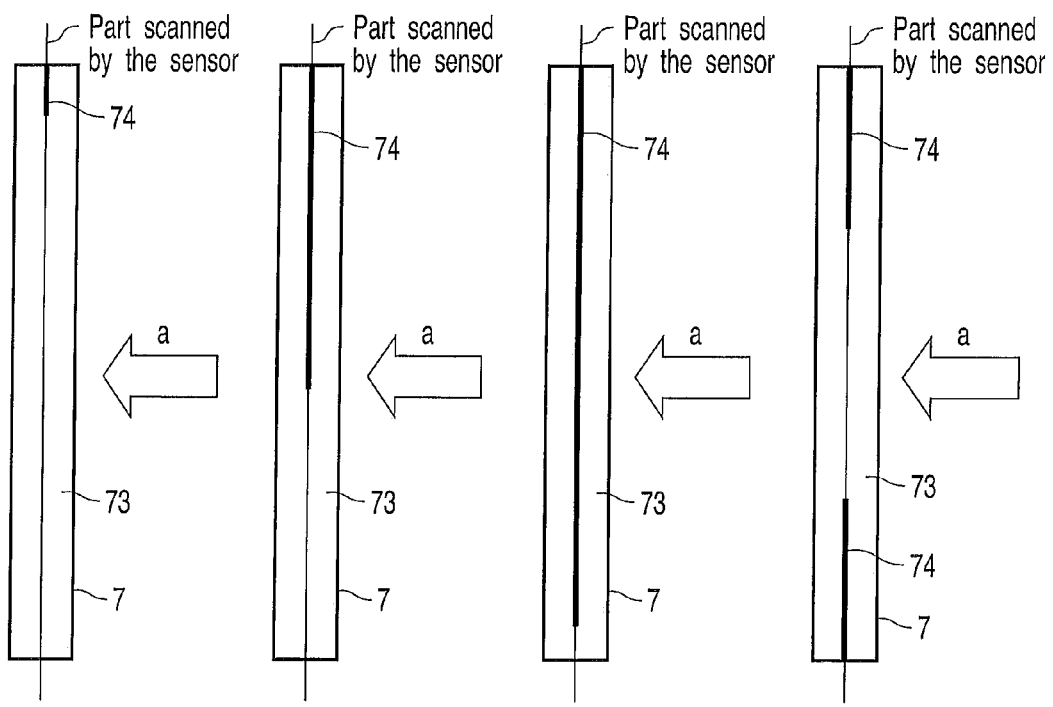
FIG. 13A is a diagram explaining another pattern the black part of the background plate may have.
FIG. 13B is a diagram explaining another pattern the black part of the background plate may have.
FIG. 13C is a diagram explaining another pattern the black part of the background plate may have.
FIG. 13D is a diagram explaining another pattern the black part of the background plate may have.

FIG. 13B is a diagram explaining a background plate 7 that has one black part 74. The black part 74 has a width that is three times the scanning width of the sensor 3, and extends for almost all either side of the background plate 7.

FIG. 13C is a diagram explaining a background plate 7 that has one black part 74. The black part 74 has a width that is three times the scanning width of the sensor 3, and extends for about half of either long side of the background plate 7.

FIG. 13D is a diagram explaining a background plate 7 that has one black part 74. The black part 74 has a width that is three times the scanning width of the sensor 3, and extends on only one end part of the background plate 7.

As described above, the black part 74 or black parts 74 of the background plate 7 can be designed in various manners, depending on the size of the sheet 8 to transport and the precision at which to detect the skew of the sheet 8.

The sensor 3 used in the embodiment described above is a line image sensor that photographs sheets 8 transported one after another. The sensor 3 is not limited to a line sensor, nevertheless. The sensor 3 may be an area sensor as in the first embodiment. The present invention can thus be reduced to practice even if an area sensor is used as image sensor 3.

FIG. 14 is a diagram schematically showing an image reading apparatus 10 that has an area image sensor used as sensor 3. FIG. 15 is a diagram schematically showing another image reading apparatus 20 that has an area image sensor used as sensor 3. The components shown in FIGS. 14 and 15, which are identical to those shown in FIG. 1, are designated by the same reference numbers and will not be described in detail.

As shown in FIG. 14, a background plate 17 lies in the photographing region of the sensor 3. The background plate 17 has a surface that opposes the sheet 8. On this surface, the background plate 17 has a white part 173 and four black parts 174. The black parts 174, each shaped like a line, extends from the middle parts of the four sides of the plate 17, respectively, toward the center of the background plate 17, each for such a distance to overlap one edge of the sheet 8. The white part 173 is provided on the entire surface of the background plate 7, except those regions in which the black parts 174 are arranged.

As shown in FIG. 15, a background plate 27 lies in the photographing region of the sensor 3. The background plate 17 has a surface that opposes the sheet 8. On this surface, the background plate 27 has a white part 273 and six black parts 274. The black parts 174, each shaped like a line, extends from the four sides of the plate 17, each for such a distance to overlap one edge of the sheet 8.

The line-shaped black parts 174 and the line-shaped parts 274 should be thick enough so that the light diffusing while passing through the sheet 8 may reach each black part 174 or 274 from the high-reflectivity part.

As indicated above, the image reading apparatus 1 has a background plate 7 in the photographing region of the sensor 3, and the plate 7 has line-shaped black parts (low-reflectivity parts) and a white part (high-reflectivity part) in the region other than the black parts. Hence, the light reflected by and the high-reflectivity part and diffusing while passing through the sheet 8 can compensate, in terms of intensity, for the light coming from those parts of the sheet 8, which overlaps the low-reflectivity parts. As a result, an image reading apparatus 1 and an image reading method can be provided, which can detect the skew of the sheet and can reliably read images of sheets.

A sheet processing apparatus that has the image reading apparatus 1 described above will be described.

Figure 16:
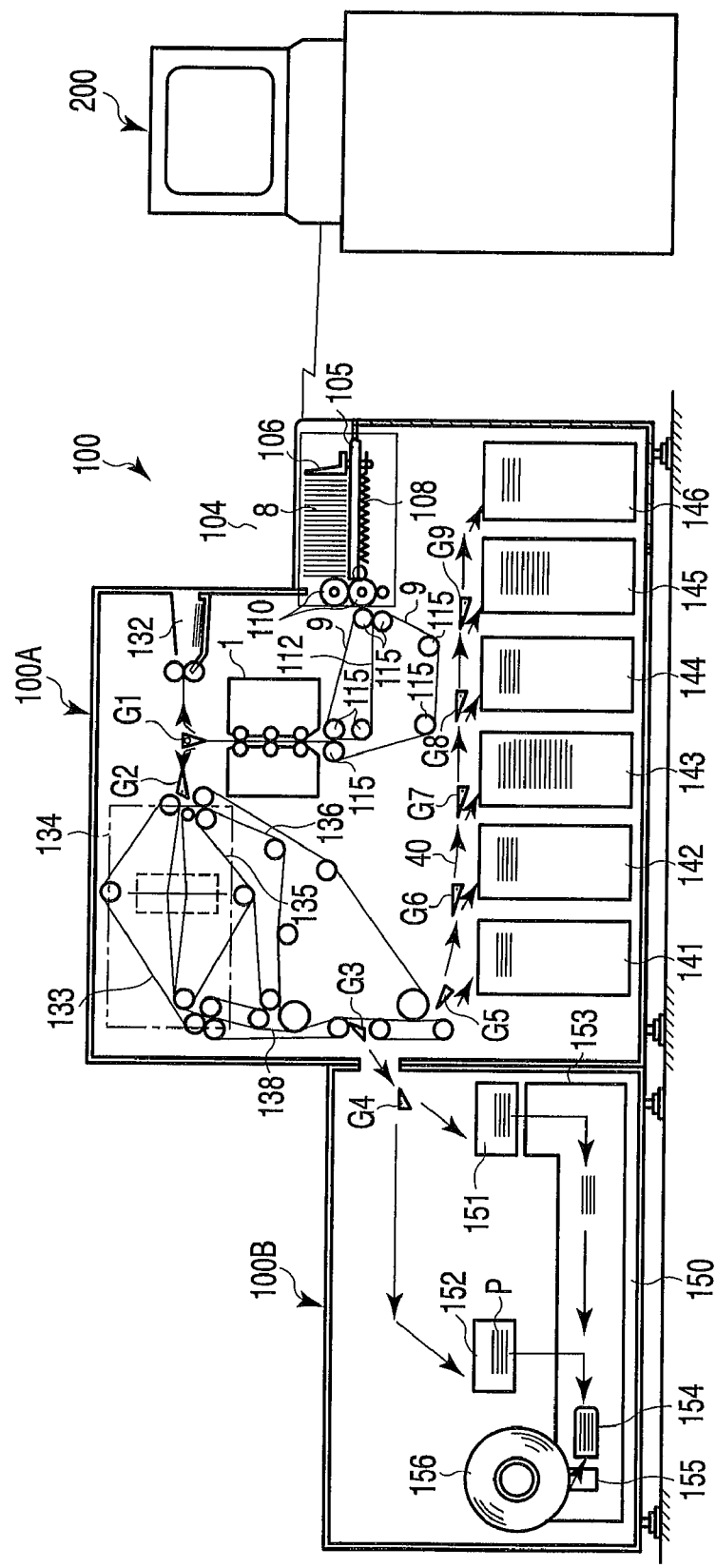
FIG. 16 is a diagram schematically showing the internal configuration of a sheet processing apparatus according to an embodiment of the invention.

FIG. 16 is a diagram schematically showing the internal configuration of a sheet processing apparatus according to an embodiment of the invention.

The sheet processing apparatus 100 comprises a sheet-processing main unit 100 and a control apparatus 200. The control apparatus 200 is configured to operate and control the sheet-processing main unit 100.

Note that the sheet processing apparatus may have additional main units 100, which are controlled by the control apparatus 200, too.

The sheet-processing main unit 100 has a sorting-collecting apparatus 100A and sealing apparatuses 100B. The sorting-collecting apparatus 100A sorts bills 8 (sheets) into groups in accordance with denomination, condition (normal or damaged), or the like. Each sealing apparatus 100B forms bundles, each consisting of a prescribed number of bills, and seals each bundle thus formed. The sheet-processing main unit 100 is so designed that any number of sealing apparatuses 100B may be connected to one sorting-collecting apparatus 100A.

Bills 8 of various denominations are fed at a time into the sorting-collecting apparatus 100A. The sorting-collecting apparatus 100A sorts the bills 8 fed to it into groups, each consisting of bills of the same denomination. The sorting-collecting apparatus 100A transports the groups of bills to storage units or to the sealing apparatuses 100B. In each sealing apparatuses 100B, the bills 8 supplied from the sorting-collecting apparatus 100A are collected in a storage unit and bundled in units of specified number.

The control apparatus 200 controls the main unit 100, sets the operating mode of the sheet-processing main unit 100, and manages the data processed in the sheet-processing main unit 100. The control apparatus 200 is constituted by, for example, a personal computer. The control apparatus 200 has a display unit, an operation unit, and a data storage unit.

The internal configuration of the sheet-processing main unit 100 will be described.

As FIG. 16 shows, the sheet-processing main unit 100 comprises a sorting-collecting apparatus 100A and a sealing apparatus 100B.

The sorting-collecting apparatus 100A has a bill-receiving unit 104, into which bills 8 are supplied. Bills 8 of various denominations are fed at a time into the bill-receiving unit 104, each with a lateral edge touching the bottom of the bill-receiving unit 104.

The bill-receiving unit 104 has a stage 105, a backup plate 106, and feeding rollers 110. Bills 8 are fed onto the stage 105, each with an upper or lower lateral edge touching the bottom of the stage 105. The backup plate 106 stands upright from the bottom of the stage 105. The backup plate 106 is biased by a spring 108 to move along the stage 105 toward the feeding rollers 110 (to the left in FIG. 16). The feeding rollers 110 are a pair of rollers. When rotated in a prescribed direction, the feeding rollers 110 feed the sheets 8, one after another, from the stage 105, starting with the leftmost sheet 8. Thus, the feeding rollers 110 function as a sheet-feeding unit. Pushed by the backup plate 106, the sheets 8 fed are moved to the left (in FIG. 16) and pressed onto the feeding rollers 110 (sheet-feeding unit).

At the downstream of the feeding rollers 110, a transport path 112 is provided. The transport path 112 is composed of a plurality of rollers 115 and a conveyor belt 9. In the transport path 112, bills 8 are sequentially transported by the conveyor belt 9 driven by the rollers 115. To the transport path 112, the bills 8 are supplied by the feeding rollers 110, one after another. For example, the feeding rollers 110 feed each bill 8 in widthwise direction, with an upper or lower lateral edge positioned forward. Of the bills 8 fed onto the transport path 112 from the feeding rollers 110, some are turned upwards, while the others turned downwards. In the configuration of FIG. 16, each bill 8 is fed from the bill-receiving unit 104, each turned downwards.

An image reading apparatus 1 of the type shown in FIG. 1 or FIG. 8 is provided on the transport path 112. As indicated above, the image reading apparatus 1 can read an image from any bill 8 and detect the skew of the bill 8.

As shown in FIG. 1 or FIG. 8, the image reading apparatus 1 comprises a light source 2, a sensor 3, an image acquiring unit 4, a control unit 5, an image processing unit 6, and a background plate 7. The image processing unit 6 functions as discriminating unit, determining the denomination of each bill 8 from the image of the bill 8, which the sensor 3 has read. The control unit 5 performs a control to collect bills 8 in collecting bins, in accordance with the denomination of each bill, which the image processing unit 6 has determined.

In the bill-receiving unit 104 of the sorting-collecting apparatus 100A shown in FIG. 16, bills 8 lie in various positions, in terms of orientation of the obverse side, reverse side, upper edge and lower edge. More precisely, each bill 8 can take one of four different positions with respect to the obverse side, reverse side, upper edge and lower edge.

Hereinafter, of the bills 8 fed from the bill-receiving unit 104, any bill having its obverse side turn up and its upper edge located forwards shall be called "front-forward (FF) bill", any bill having its obverse side turn up and its lower edge located forwards shall be called "front-rearward (FR) bill", any bill having its reverse side turn up and its upper edge located forwards shall be called "back-forward (BF) bill", and any bill having its reverse side turn up and its lower edge located forwards shall be called "back-rearward (BR) bill". That is, any bill 8 that is transported through the image reading apparatus 1 takes one of these four positions.

The image reading apparatus 1 determines the orientation of each bill 8 being transported in the transport path 112, from the image of the bill 8. The image reading apparatus 1 also determines whether the bill being transported in the transport path 112 can be processed or not, from the image of the bill 8.

On the transport path 112 extending from the output end of the image reading apparatus 1, a plurality of gates G1 to G9 are provided, each for guiding each bill 9 in one of two directions in accordance with the image of the bill 8.

The gate G1 sorts bills 8 into two groups, bills 8 that can be processed, and bills 8 that cannot be processed. Any bill 8 that has been determined not able to be processed is transported from the gate G1 to a rejection bin 132 (located at the left in FIG. 16). A bill 8 that cannot be processed is one fed along with another, one excessively skewed over a preset value, or one found unable to be reused, e.g., a damaged bill or a counterfeit. The rejection bin 132 can be accessed to from outside the sheet-processing main unit 100. Thus, an operator can remove bills 8 from the rejection bin 132.

Any bill 8 that has been determined able to be processed is transported from the gate G1 to the gate G2 (located on the left of the gate G1). The gate G2 sorts bills 8 into two groups in accordance with whether each bill 8 has the obverse side turned up or down. At the downstream of the gate G2, the transport path is forked. Thus, the gate G2 switches the direction of transporting a bill 8 to one or the other, in accordance with whether the bill 8 has the obverse side turned up or down.

On one of the two transport paths extending from the downstream end of the gate G2, a bill-inversing mechanism 134 (obverse/reverse changing unit) is provided to turn each bill 8 over. The other transport path 136 extending from the downstream end of the gate G2 is a transport path that allows bills 8 to pass through, without being turned over. Thus, at the downstream of the gate G2, bills 8 can have the same side turned up or down.

The bill-inversing mechanism 134 comprises two conveyor belts 133 and 135. The conveyor belts 133 and 135 constitute a transport path that is twisted by 180 around an axis, as it extends from its inlet port to the outlet port. Therefore, any bill sorted to the bill-inversing mechanism 134 is turned upside down. For example, an FF bill sorted to the mechanism 134 is turned upside down and thereby rendered a BF bill.

A bill 8 turned upside down while passing through the bill-inversing mechanism 134 and a bill not passing through the bill-inversing mechanism 134 but passing through the transport path (transport passage) 136 are fed through a confluence part 138 to the gate G3.

The sorting-collecting apparatus 100A is so configured that the time a bill 8 travels from the gate G2 to the confluence part 138 via the bill-inversing mechanism 134 is equal to the time another bill 8 travels from the gate G2 to the confluence part 138 via the transport path 136. Thus, the bill 8 transported via the bill-inversing mechanism 134 and the bill 8 transported via the transport path 136 pass the confluence part 138 at the same time. As a result, all bills 8 at the confluence part 138 are BF bills, which are transported to the gate G3.

The gate G3 sorts the bills 8 coming through the confluence part 138. At the downstream of the gate G3, the transport path is forked. Thus, the gate G3 switches the direction of transporting a bill 8 to one or the other, in accordance with the denomination (or condition) of the bill 8.

One of the two transport paths extending from the downstream end of the gate G3 is a path for transporting bills 8 to the sealing apparatus 100B. The other transport path (horizontal transport path) 140 extending from the downstream end of the gate G3 is a path for transporting bills 8 to collecting bins 141 to 146 provided in the sorting-collecting apparatus 100A and configured to collect bills 8. The other transport path 140 extends almost horizontally above the collecting bins 141 to 146. On the other transport path 140, five gates G5 to G9 are provided, each configured to sort bills 8 into two adjacent ones of the collecting bins 141 to 146. The collecting bins 141 to 146 collect the bills 8 sorted into them. The collecting bins 141 to 146 have a sensor each, which detects whether bills 8 are collected in the collecting bin.

The collecting bins 141 to 146 accumulate bills 8 the sheet processing apparatus will process, each collecting bills 8 of a specific denomination. The control unit 5 controls the gates G5 to G9 so that bills 8 may be sorted and collected in the collecting bins, in accordance with the denomination that the image-characteristic calculating unit 63 has determined of each bill. Thus, the control unit 5 functions as a control means.

Any bills 8 selected by the gate G5 located most upstream of the transport path 140 are accumulated in the collecting bin 141. Any bills 8 selected by the gate G6 are accumulated in the collecting bin 142. Any bills 8 selected by the gate G7 are accumulated in the collecting bin 143. Any bills 8 selected by the gate G8 are accumulated in the collecting bin 144. Any bills 8 selected by the gate G9 are accumulated in the collecting bin 145 or the collecting bin 145.

As shown in FIG. 16, the sealing apparatus 100B has a collecting bin 151, a collecting bin 152, a supply unit 153, a sealing mechanism 154, a printing mechanism 155, and a band-supplying unit 156. The collecting bins 151 and 152 collect the bills 8 selected by, coming from, the gate G4. The collecting bins 151 and 152 have a sensor each, which detects whether bills 8 are collected in the collecting bin.

The supply unit 153 supplies bills 8 in units of a specific number (e.g., 100) from the collecting bit 151 or 152 to the sealing mechanism 154. The sealing mechanism 154 first bundles the bills 8 in the specific number (e.g., 100) supplied by the supply unit 153 from the collecting bit 151 or 152, and then seal the resulting bundle of bills with a band. The printing mechanism 155 prints prescribed data on the band. The band-supplying unit 156 supplies a band to the sealing mechanism 154, which seals the bundle of bills, with the band.

Bills 8 are supplied to the sealing apparatus 100B from the gate G3 of the sorting-collecting apparatus 100A along the transport path branched at the gate G3 and extending to the left (in FIG. 16). The bills 8 supplied from the sorting-collecting apparatus 100A are sorted by the gate G4 into two groups. The bills 8 of one group are collected in the collecting bit 151. The bills 8 of the other group are collected in the collecting bin 152.

The supply unit 153 supplies the bills 8 selected by the gate G4 and collected in the collecting bins 151 or 152 to the sealing mechanism 154. The sealing mechanism 154 seals a prescribed number of bills 8 supplied by the supply unit 153, with a band supplied from the band-supplying unit 156, forming a bundle of bills. The bundle is transported from the sealing apparatus 100B by a conveyor (not shown).

The sorting-collecting apparatus 100A is configured to supply bills 8 of a specific type to the sealing apparatus 100B. The sealing apparatus 100B therefore bundles and seals the groups of bills supplied from the sorting-collecting apparatus 100A. The bills 8 other than those to seal in the sealing apparatus 100B are accumulated in the collecting bins 141 to 146 provided in the sorting-collecting apparatus 10A.

The configuration described above can provide a sheet processing apparatus that can detect the skew of each sheet and can reliably read the image of each sheet.

The present invention is not limited to the embodiments described above. The components of any embodiment can be modified in various manners in reducing the invention to practice, without departing from the sprit or scope of the invention. Further, the components of any embodiment described above may be combined, if necessary, in various ways to make different inventions. For example, some of the component of any embodiment may not be used. Moreover, the components of the different embodiments may be combined in any desired fashion.

In the first and second embodiments described above, the image reading apparatus 1 has the control unit 5 and the image processing unit 6. This invention is not limited to this, nevertheless. For example, the sheet-processing main unit 100 or the control apparatus 200 may have the control unit 5 and the image processing unit 6.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
   an illuminating unit configured to illuminate sheets being transported, one after another;
   a sensor having an imaging elements arranged in a line and configured to photograph the sheets one after another;
   a background member having a white-reference part provided in a part of a photographing region of the sensor and a black-reference part configured to restrict application of the light reflected by the illuminating unit to the sensor, the black-reference part being provided in the photographing region of the sensor.

2. The image reading apparatus according to claim 1, wherein the black-reference part of the background member is a directional reflecting member that reflects incident light in a specific direction, thereby to inhibit the light reflected by the illuminating unit and applied to the black-reference part from being applied to the sensor.

3. The image reading apparatus according to claim 2, wherein the directional reflecting member is a mirror-surface member.

4. The image reading apparatus according to claim 2, wherein the directional reflecting member is a reflexive reflection member.

5. The image reading apparatus according to claim 1, wherein the black-reference member of the background plate is a low-reflective member provided in a part of the photographing region of the sensor and having a specific width as measured in a direction at right angles to a scanning direction of the sensor.

6. The image reading apparatus according to claim 1, wherein the black-reference member of the background plate is a low-reflective member provided in a part of the photographing region of the sensor and having a specific width less than three times the width of the photographing region, as measured in a direction at right angles to a scanning direction of the sensor.

7. The image reading apparatus according to claim 1, wherein the black-reference member of the background plate is provided, overlapping a lateral edge of a sheet being transported in the photographing region of the sensor.

8. The image reading apparatus according to claim 1, further comprising a detecting unit configured to detect a skew of a sheet being transported, from an image of the sheet photographed by the sensor.

9. An image reading method comprising:
   Illuminating sheets being transported, one after another;
   photographing the sheets one after another, by a sensor having an imaging elements arranged in a line;
   providing a white-reference part provided in a part of a photographing region; and
   providing a black-reference part configured to restrict application of the light reflected by the illuminating unit to the sensor, the black-reference part being provided in the photographing region of the sensor.

10. A sheet processing apparatus comprising:
    a receiving unit configured to receive sheets;
    a feeding unit configured to feed the sheets, one by one, from the receiving unit;
    a transporting unit configured to transport the sheets from the feeding unit;
    an illuminating unit configured to illuminate the sheets being transported by the transporting unit;
    a sensor having an imaging elements arranged in a line and configured to photograph the sheets being transported by the transporting unit, one after another;
    a background member having a white-reference part provided in a part of a photographing region of the sensor and a black-reference part configured to restrict application of the light reflected by the illuminating unit to the sensor; the black-reference part being provided in the photographing region of the sensor,
    a discriminating unit configured to determine the type of each sheet from the image of the sheet, which the sensor has read; and
    a control unit configured to perform a control, thereby to collect the sheets in collecting bins, in accordance with the types of the sheets, which discriminating unit has determined.

* * * * *